T. ELLIOTT.
Thrashing Machine.
No. 1,111.  Patented March 26, 1839.
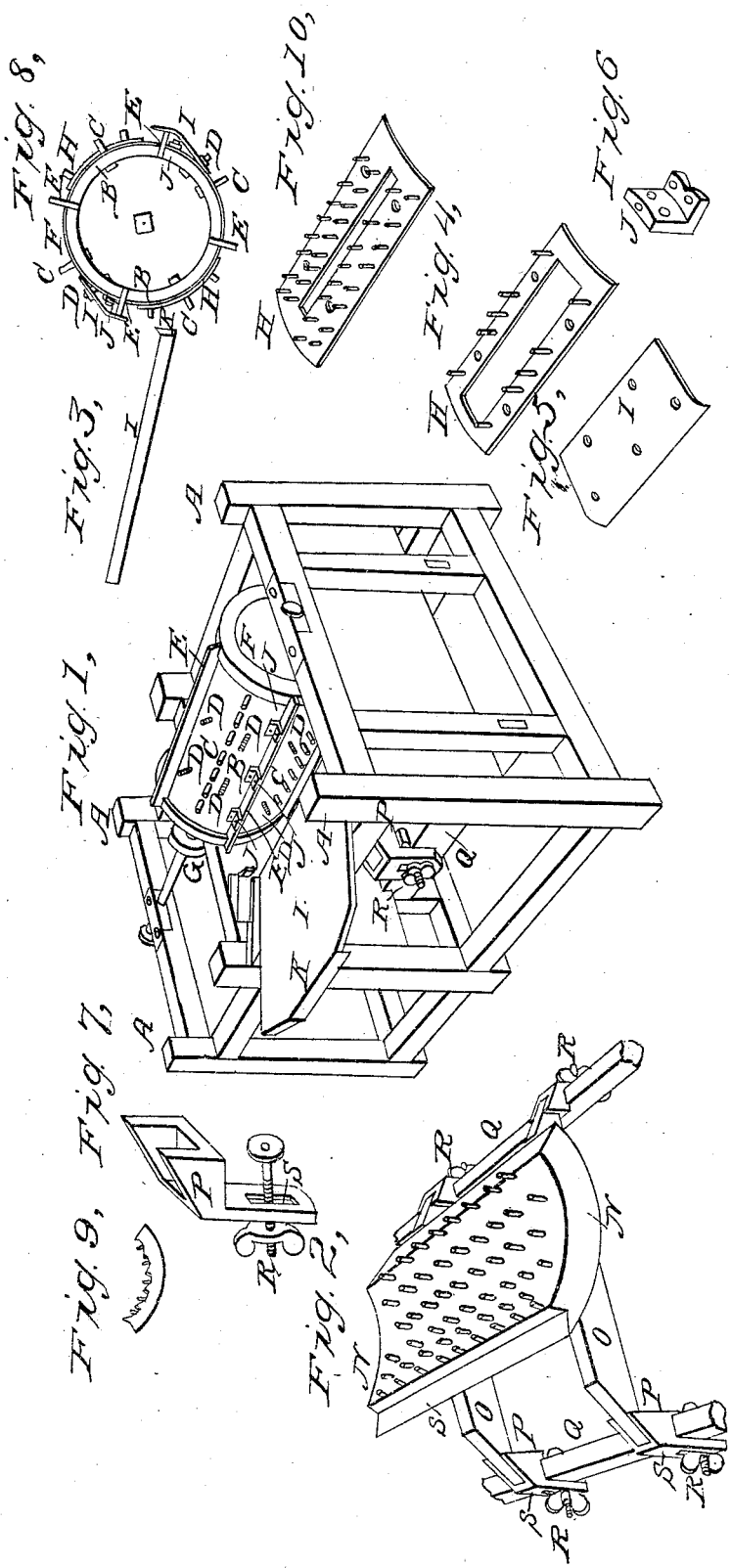

UNITED STATES PATENT OFFICE.

THOMAS ELLIOTT, OF NEAR MIDDLETOWN, KENTUCKY.

IMPROVEMENT IN MACHINES FOR THRASHING, SHELLING, AND HULLING GRAIN AND CUTTING STRAW.

Specification forming part of Letters Patent No. 1,111, dated March 26, 1839.

*To all whom it may concern:*

Be it known that I, THOMAS ELLIOTT, of near Middletown, in the county of Jefferson and State of Kentucky, have invented a new and useful Improvement in Machines for Thrashing all Kinds of Small Grain, for Shelling Corn, Hulling Clover-Seed, and for Cutting Straw, which is described as follows, reference being had to the annexed drawings of the same, making a part of this specification.

Figure 1 is a perspective view of the machine as arranged for thrashing small grain. Fig. 2 is a view of the concave in the manner in which it is placed in the metallic sliding boxes. Fig. 3 is an edge view of the feeding-board, showing the knife at the end of it for cutting straw. Figs. 4 and 10 are views of one of the segment-plates with spikes to be fastened onto the cylinder for hulling clover-seed and shelling corn. Fig. 5 is one of the knives to be secured to the cylinder for cutting straw. Fig. 6 is one of the metallic blocks or stays for fastening the knives to the cylinder. Fig. 7 is one of the metallic sliding boxes for raising or lowering the concave. Fig. 8 is a transverse section of the cylinder, showing the knives in their proper position for cutting straw, the stays or blocks, and the segment-plates for shelling corn or hulling clover-seed. Fig. 9 is a view of a concave the surface of which is grooved having iron plates on the lower edge of each groove and a row of spikes in front of each iron plate or rib.

The several letters of reference in the following description point out the same parts in the drawings that the figures refer to.

This machine is constructed by a frame A of wood, of a size to suit the power to be applied; but a size suitable to be driven by two horses is two feet and six inches wide, three feet four inches long, and about thirty inches high, with a cylinder B of iron or wood long enough to fill the width of the box on the inner side. This box is to be lined on the inside with thin plank previous to the concave being fitted in, so as to prevent the grain from escaping over the ends of said concave. The cylinder is formed of four segments B B B B, which are fitted and secured to circular cast-iron heads, through which heads the center shaft passes. This cylinder is also secured by strong bands or tiers fitted on the outer surface of each end of the cylinder. One row of spikes C, about one-quarter of an inch in diameter, is driven into the middle of the outer surface of each of these segments about one inch apart, and extending just as far from the surface of the cylinder as the beaters which are hereinafter described. On each side of every row of spikes are to be made three holes, about one-half an inch in diameter, to admit screw-bolts for fastening on segment-plates containing four rows of spikes each, for the purpose of shelling corn, &c., four bars or beaters of iron E, about two inches in width and near three-eighths of an inch thick, are inserted between the segments of the cylinder at the periphery thereof. In each end of these beaters are cut grooves one inch in length, one-half an inch wide to admit bands F, by which they are permanently fastened to the cylinder. This cylinder may be suspended by a shaft, the journals turning in three anti-friction or plain boxes with a small whirl G between two of the boxes near the side of the boarded part of the frame. The size of this whirl and of the cylinder should be proportioned to the velocity given by the propelling-power. A twelve-inch cylinder should be so geared as to have about twelve hundred revolutions per minute.

For the purpose of shelling corn or clover-seed a segment-plate, of iron H, Figs. 4 and 10, is formed with from two to four rows of spikes fastened into it, and holes made in this plate corresponding with the screw-bolts in the cylinder above mentioned, admitting these plates to drop over said screw-bolts and fastened down by screw-taps. Such plates having four rows of spikes in each, are thus fastened between the beaters around the surface of the cylinder and are movable at pleasure, and should be left off except when the machine is used for some purpose that requires a strong rubbing operation, as in shelling corn or hulling clover-seed. None of these spikes should extend farther from the surface of the cylinder than the edges of the bars E on the same.

For the purpose of cutting straw two blades or knives I, Figs. 5 and 8, are formed of steel, the edges of which are beveled somewhat, as a plane-bit, and a slight crook about one-half inch from the edge. These knives are so placed on the cylinder as to extend about one-half or three-fourths of an inch over the edges of the beaters, to which they are fastened by screws entering blocks of iron J, Figs. 16 and 8. These blocks are secured to the beaters by rivets and to the cylinder by screws. In the back part of each blade or knife there are made holes corresponding with one row of the screw-bolts on the cylinder to which it is fastened by the nuts of the same. These blades as the cylinder revolves pass a knife K, which is fastened onto the edge of the feeding-board L. This board is slipped into the back part of the box in a groove made by nailing on cleats or otherwise, so as to support it while the knife K on the edge of this board comes near enough to the cylinder to admit the blades I in revolving to pass immediately by its edge, and is prevented from coming in contact with those on the cylinder by means of strong iron stays, which are nailed to the frame on the inside. One end of each bends at right angles, forming a protection to the knife, against which it rests. A concave N, Fig. 2, is formed of iron or wood, the upper edge of which commences about horizontal with the center of the cylinder and passing about one-fourth the way around the same, in the surface of which may be inserted about six rows of iron spikes, three-eighths of an inch in diameter, showing about a half-inch above the surface; or its surface may be formed in the manner represented at Fig. 9—that is, with parallel channels or grooves the lower edges of which are plated, representing bars or ribs, and in the center of each groove is inserted a row of spikes extending about as high as the edges of the bars or ribs. This concave is long enough to fill the width of the box inside, so as to admit its being slipped up or down. It rests on and is fastened to two parallel longitudinal timbers O O, the ends of which are fitted in four metallic sliding boxes P P P P. These boxes rest on cross-girts Q Q in the frame, and are secured to them by screw-bolts and taps R R R R working in slots S, Fig. 7, in the metallic sliding boxes, by means of which the concave is raised or lowered to suit the kind of grain to be thrashed.

The frame of the box may be extended in width about twelve inches beyond the whirl on the cylinder-shaft, in the center of which extended frame and parallel with the other journals is placed a third box for the end of the cylinder-shaft to turn in, the object of which is to equalize the friction of the journals, preventing a tight band from causing the journals to wear one of the boxes above and one below according to the pressure, as in the ordinary mode, and also to steady the motion of the cylinder. By effecting this the machine runs with much more ease.

For thrashing small grain the machine is set as described in drawings, Fig. 1, with only the alternate rows of spikes and beaters in the cylinders, the concave being raised near the cylinder and blocks placed under the metallic slides and tightening the screw-bolts. By these metallic slides the concave may be elevated or depressed at either end, thus regulating the feeding of the machine in this operation.

For cutting straw the feeding-board must be placed in the grooves made by cleats U with the knife K on the edge of it coming against the stays M. On the cylinder are secured two blades I I, which pass near the edge of the knife on feeding-board and cut the straw as it is fed over it. The concave must be let entirely down in this operation.

For shelling corn the cutting-blades must be removed from the cylinder, the segment-plates and spikes fastened between each two beaters, the feeding-board taken out of the grooves, and the contrary end placed in a groove S on the concave, which should be secured at a suitable distance from the cylinder as to admit the ears of corn to enter between the concave and cylinder.

For hulling clover-seed the concave must be raised until very near the cylinder, and secured at this position, as above described, the same segment-plates remaining on the cylinder, as in the operation of shelling corn.

The invention claimed, and desired to be secured by Letters Patents, consists—

1. In the arrangement of the knives on the cylinder and feeding-board in combination for cutting straw, as described.

2. In the construction and arrangement of the movable segment-plates for shelling corn.

3. The arrangement and construction of the metallic sliding boxes (with screws and taps) for raising and lowering the concave to suit the different kinds of grain to be thrashed, and for regulating the feeding in small grain, as described.

THOS. ELLIOTT.

Witnesses:
 DANL. WORTH,
 JESSE D. HARPER.